United States Patent
Osmeda et al.

(10) Patent No.: US 11,867,140 B1
(45) Date of Patent: Jan. 9, 2024

(54) EVAPORATIVE EMISSIONS CANISTER WITH LAYERED CARBON

(71) Applicant: DELPHI TECHNOLOGIES IP LIMITED, St. Michael (BB)

(72) Inventors: Michal Osmeda, Slomniki (PL); Arkadiusz Wiatr, Cracow (PL)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 17/940,389

(22) Filed: Sep. 8, 2022

(51) Int. Cl.
*F02M 25/08* (2006.01)
*F02M 35/10* (2006.01)
*B01D 53/04* (2006.01)

(52) U.S. Cl.
CPC ..... *F02M 25/0854* (2013.01); *B01D 53/0415* (2013.01); *F02M 35/10222* (2013.01); *B01D 2253/102* (2013.01); *B01D 2257/702* (2013.01); *B01D 2259/402* (2013.01); *B01D 2259/4516* (2013.01); *B01D 2259/4566* (2013.01)

(58) Field of Classification Search
CPC ............. F02M 25/0854; F02M 25/089; B01D 53/0415; F02D 41/0032; F02D 41/0042; F02D 41/0045
See application file for complete search history.

(56) References Cited

U.S. PATENT DOCUMENTS

| | | | |
|---|---|---|---|
| 6,230,693 B1 * | 5/2001 | Meiller | F02M 25/0854 123/557 |
| 6,279,548 B1 * | 8/2001 | Reddy | B60K 15/03504 123/557 |
| 8,360,034 B2 | 1/2013 | Yamasaki | |
| 2001/0020418 A1 * | 9/2001 | Yamafuji | F02M 25/0854 96/132 |
| 2008/0202481 A1 * | 8/2008 | Kalina | F02D 41/1459 123/520 |
| 2013/0000609 A1 | 1/2013 | Yamamoto et al. | |
| 2013/0160651 A1 | 6/2013 | Mani | |
| 2013/0269521 A1 | 10/2013 | Nishita et al. | |
| 2021/0172402 A1 | 6/2021 | Byrne et al. | |
| 2021/0388798 A1 | 12/2021 | Iwamoto | |
| 2022/0260027 A1 * | 8/2022 | Viola | F02D 41/0072 |
| 2022/0260042 A1 * | 8/2022 | Viola | F02M 25/089 |

FOREIGN PATENT DOCUMENTS

| WO | 2014059190 A1 | 4/2014 |
|---|---|---|
| WO | 2019115810 A1 | 6/2019 |

* cited by examiner

*Primary Examiner* — John Kwon
(74) *Attorney, Agent, or Firm* — Warner Norcross + Judd LLP

(57) ABSTRACT

An evaporative emissions canister is provided. The canister includes a casing defining an internal volume therein, and an inlet and outlet in fluid communication with the internal volume. The internal volume includes a layer of first adsorbent material and a layer of second adsorbent material. The first adsorbent material has a flow restriction that is lower than the flow restriction of the second adsorbent material. A fluid flow path is defined from the inlet through the internal volume of the casing to the outlet. The fluid flow path includes a transition zone of changing cross-sectional area in the direction from the inlet to the outlet. The layer of first adsorbent material is disposed at or directly adjacent to the transition zone, and the layer of first adsorbent material is disposed adjacent to and immediately upstream from the layer of second adsorbent material in the direction.

18 Claims, 3 Drawing Sheets

EVAPORATIVE EMISSIONS CANISTER WITH LAYERED CARBON

FIELD OF THE INVENTION

The disclosure generally relates to evaporative emissions canisters for adsorption of fuel vapors in fuel powered automotive vehicles.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge and purge ports for fuel vapor are communicated with one end of the gas passage, while an atmospheric port (vent port) for fuel vapor is communicated with the other end of the gas passage, thus allowing for charging of the canister. During stoppage of the vehicle (e.g., when parked), fuel vapor generated from the fuel in the fuel tank is introduced through the charge port into the canister and adsorbed by the adsorbent. During operation of the engine, atmospheric air is introduced through the atmospheric vent port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

Conventional evaporative emissions canisters commonly use one grade of carbon adsorbent throughout the filled regions of the canister casing, or at least throughout one full chamber of the canister. However, conventional evaporative emissions canisters can suffer from poor air flow through parts of the canister casing, which leads to "dead zones" inside the canister in which adsorbent volumes are not efficiently or adequately charged and/or purged during operation of the vehicle. Certain of these dead zones are especially prevalent in adsorbent bed regions at which there are significant changes in the casing cross-sectional area. Therefore, a need exists for improved flow distribution within the casing.

BRIEF SUMMARY

An improved evaporative emissions canister is provided. The evaporative emissions canister includes a casing defining an internal volume therein. The casing includes an inlet and an outlet in fluid communication with the internal volume. The internal volume includes a layer of first adsorbent material and a layer of second adsorbent material. The first adsorbent material has a flow restriction that is lower than the flow restriction of the second adsorbent material. A fluid flow path is defined from the inlet through the internal volume of the casing to the outlet. The fluid flow path has a cross-sectional area that varies in a direction from the inlet to the outlet, and the fluid flow path includes a transition zone of changing cross-sectional area in the direction from the inlet to the outlet. The layer of first adsorbent material is disposed at or directly adjacent to the transition zone, and the layer of first adsorbent material is disposed adjacent to and immediately upstream from the layer of second adsorbent material in the direction. The layer of first adsorbent material spreads a flow of fluid along the fluid flow path into the layer of second adsorbent material.

In specific embodiments, the first adsorbent material has a mean particle diameter that is at least 1.2 times larger than the mean particle diameter of the second adsorbent material.

In particular embodiments, the first adsorbent material is a pellet carbon, and the second adsorbent material is a granular carbon.

In specific embodiments, the internal volume includes the transition zone of changing cross-sectional area.

In particular embodiments, the internal volume includes a first zone having a first cross-sectional area. The first zone is at the inlet end of the casing. In these embodiments, the internal volume further includes a second zone having a second cross-sectional area. The second zone is at the outlet end of the casing, and the second cross-sectional area is larger than the first cross-sectional area. The transition zone of changing cross-sectional area is disposed between the first and second zones. The transition zone includes the layer of first adsorbent material, and the second zone includes the layer of second adsorbent material.

In certain embodiments, the first zone includes a layer of third adsorbent material. The third adsorbent material has a flow restriction that is higher than the flow restriction of the first adsorbent material. In other embodiments, the third adsorbent material is the same as the second adsorbent material.

In certain embodiments, the first zone includes a volume of void space.

In specific embodiments, a height of the layer of first adsorbent material in the direction from the inlet to the outlet is smaller than a height of the layer of second adsorbent material in said direction.

In specific embodiments, the change in cross-sectional area in the transition zone is stepped in the direction from the inlet to the outlet.

A fuel vapor storage canister for adsorbing fuel evaporated in a fuel tank of an automotive vehicle is also provided. The fuel vapor storage canister includes a casing forming a main body defining at least one chamber therein. The canister also includes a vent port in the main body. The vent port is open to atmosphere. The canister further includes a purge port in the main body. The purge port is on an opposite end of the main body than the vent port, and the purge port is in fluid communication with an air intake system of the vehicle. The at least one chamber has a cross-sectional area that varies in a direction from the vent port to the purge port. The at least one chamber includes a bed of first adsorbent material and a bed of second adsorbent material. The first adsorbent material has a flow restriction that is lower than the flow restriction of the second adsorbent material. The bed of first adsorbent material is disposed at or directly adjacent to a transition zone of changing cross-sectional area of the at least one chamber in the direction from the vent port to the purge port, and the bed of first adsorbent material is disposed adjacent to and immediately upstream from the bed of second adsorbent material in said direction.

In specific embodiments, the first adsorbent material has a mean particle diameter that is at least 1.2 times larger than the mean particle diameter of the second adsorbent material.

In particular embodiments, the first adsorbent material is a pellet carbon, and the second adsorbent material is a granular carbon.

In specific embodiments, the change in cross-sectional area in the transition zone is stepped in the direction from the vent port to the purge port.

A method of making an evaporative emissions canister is also provided. The method includes providing a casing having an internal volume, an inlet and an outlet in fluid communication with the internal volume, and a fluid flow path defined from the inlet through the internal volume of the casing to the outlet. The fluid flow path has a cross-sectional area that varies in a direction from the inlet to the outlet, and the fluid flow path includes a transition zone of changing cross-sectional area in the direction from the inlet to the outlet. The method further includes the step of disposing a layer of first adsorbent material at or directly adjacent to the transition zone. The method further includes the step of disposing a layer of second adsorbent material adjacent to and immediately downstream from the layer of first adsorbent material in said direction. The first adsorbent material has a flow restriction that is lower than the flow restriction of the second adsorbent material, and the layer of first adsorbent material spreads a flow of fluid along the fluid flow path into the layer of second adsorbent material.

In specific embodiments, the first adsorbent material has a mean particle diameter that is at least 1.2 times larger than the mean particle diameter of the second adsorbent material.

In particular embodiments of the method, the first adsorbent material is a pellet carbon, and the second adsorbent material is a granular carbon.

In specific embodiments of the method, the change in cross-sectional area in the transition zone is stepped in the direction from the inlet to the outlet.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
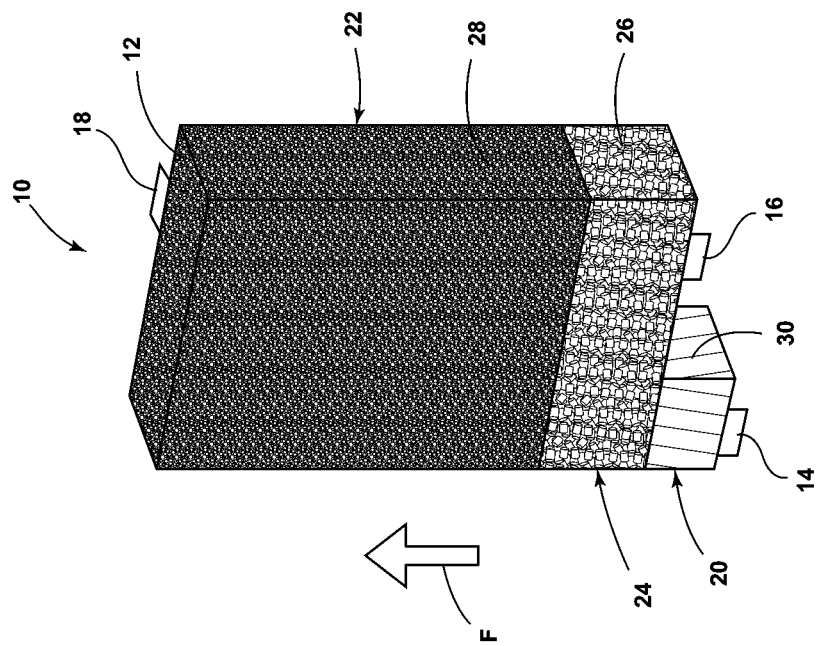
FIG. 1 is a perspective schematic view of an evaporative emissions canister in accordance with some embodiments of the disclosure.
Figure 2:
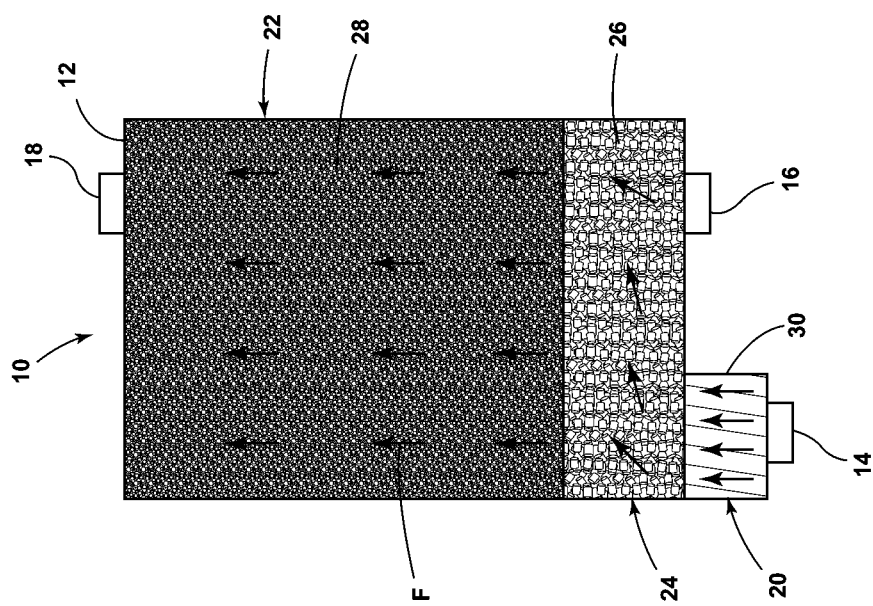
FIG. 2 is a side schematic view of fluid flow through the evaporative emissions canister of FIG. 1.
Figure 3:
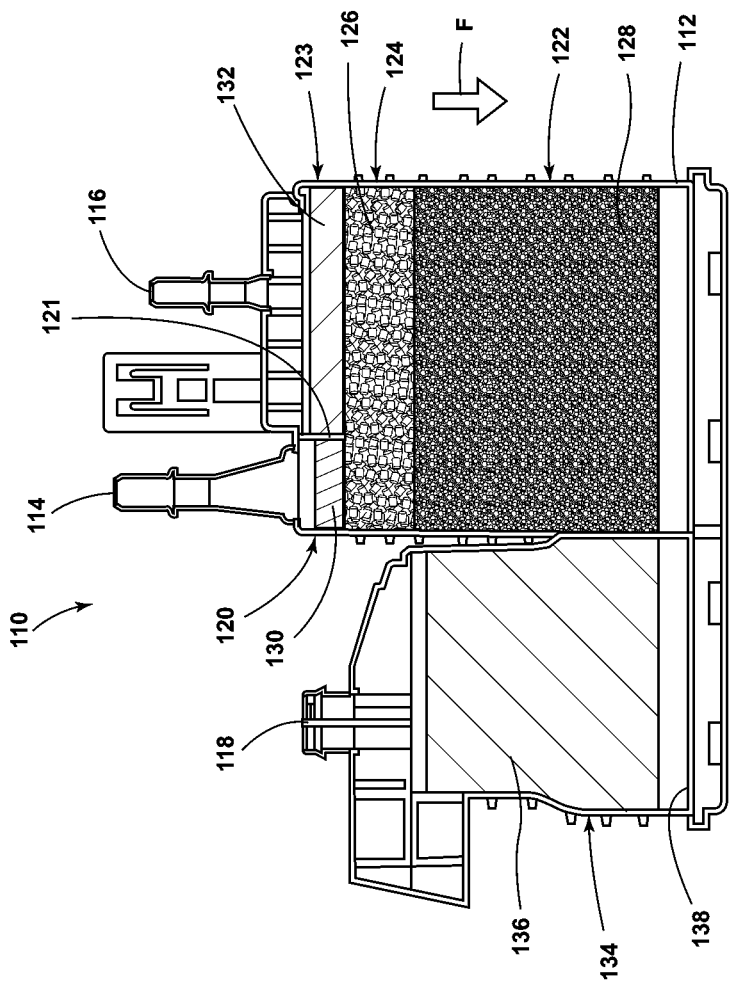
FIG. 3 is sectional view of an evaporative emissions canister in accordance with certain embodiments of the disclosure.

An evaporative emissions canister is provided. Referring to FIGS. 1-3, wherein like numerals indicate corresponding parts throughout the several views, the evaporative emissions canister is illustrated and generally designated as a fuel vapor storage canister 10 for a fuel tank of a vehicle fuel system that pumps liquid fuel, by way of non-limiting example gasoline fuel, from the fuel tank (not shown) to an internal combustion engine (not shown) that powers an automotive vehicle. The fuel vapor storage canister 10 traps fuel vapors that arise in the fuel tank during periods of non-use of the internal combustion engine due to, for example, daily variations in ambient temperatures. The fuel vapor storage canister 10 exhibits improved internal fluid flow, thereby leading to reduction of dead zones and more efficient purging of the canister 10.

FIG. 1 generally depicts a fuel vapor canister 10 used in a vehicle fuel system. The fuel vapor canister 10 includes a casing 12 that forms a main body of the canister 10. The casing 12 defines an internal volume within the main body. The internal volume may be one single chamber inside the canister, or may be partitioned into a plurality of chambers. The casing 12 has at least one inlet and outlet in fluid communication with the internal volume of the casing 12. Particularly, the casing 12 has a charge port 14, a purge port 16, and a vent port 18. The charge port 14 and purge port 16 are disposed at one end of the internal volume of the casing 12, while the vent port 18 is disposed at an opposite end, so that there may be fluid flow between the charge port 14 and the vent port 18 or between the vent port 18 and the purge port 16. The charge port 14 is connected to and in fluid communication with the vehicle fuel tank via a conduit or similar, while the vent port 18 is open to the atmosphere for venting the canister 10 and for admission of purge air. The purge port 16 is connected to and in fluid communication with an air intake system of the engine via a conduit or similar. As described in greater detail below, during non-use of the internal combustion engine when the engine is off, fuel vapors generated in the fuel tank travel through the charge port 14 and into the internal volume of the casing 12. The fuel vapors become trapped in the canister casing 12, and air exits the casing 12 through the vent port 18. During periods of use of the internal combustion engine when the engine is running, air is drawn into the canister 10 through the vent port 18, and the trapped fuel vapors are expelled from the casing 12 through the purge port 16 and into the air intake system of the internal combustion engine. It is therefore apparent that the charge port 14 is an inlet and the purge port 16 is an outlet, while the vent port 18 may be an outlet or an inlet depending on the operation of the canister 10 (charging versus purging) and the associated direction of flow. A fluid flow path thereby extends from the charge port 14 through the internal volume of the casing 12 to the vent port 18 in one direction of flow in one operational mode of the canister 10, and from the vent port 18 through the internal volume of the casing 12 to the purge port 16 in another operational mode of the canister 10.

The internal volume of the casing 12 has a cross-sectional area that varies in a direction from the charge port 14 to the vent port 18 which may generally be designated as a flow direction F of fluid (air and fuel vapors) that travel from the charge port 14 to the vent port 18 during charging of the canister 10. The direction F may be referred to as the adsorption direction. The casing 12 is not limited to any particular geometry and may be box-shaped and have, for example, a generally rectangular cross-section in a direction generally perpendicular to the flow direction. However, the casing 12 may instead or in addition have or include separate chambers that have any one of a conical, a frustoconical, and/or a cylindrical shape and therefore a generally circular cross-section. The cross-sectional area of the internal volume of the casing 12 may increase from the charge port 14 to the vent port 18 such that the internal volume includes a first zone 20 adjacent the charge port 14 that has a first, smaller cross-sectional area, a second zone 22 adjacent the vent port 18 that has a second, larger cross-sectional area that is larger than the cross-sectional area of the first zone 20, and a transition zone 24 disposed between the first zone 20 and the second zone 22. The transition zone 24 is a zone in which the cross-sectional area changes from the first cross-sectional area to the second cross-sectional area. The cross-sectional area may change rapidly in the transition zone 24 such that the area increases dramatically and at a large factor relative to the direction of (charge) flow. In some embodiments as shown in FIG. 1, the change in cross-sectional area in the transition zone 24 may be nearly instantaneous in the flow direction from the charge port 14 to the vent port 18 such that there is a step-change in area from the first zone 20 to the second zone 22, and the transition zone 24 may include a volume of the casing 12 directly adjacent to the change in cross-sectional area in a downstream direction. In other words, the internal volume of the casing 12 may be stepped from the first zone 20 to the second zone 22, and in this case the transition zone 24 is a portion of the internal volume directly adjacent to the step between the first zone 20 and second zone 22 in the downstream direction, and the transition zone has a cross-sectional area generally equal to that of the second zone 22.

During purging of the canister 10, fluid (air and fuel vapors) flows from the vent port 18 to the purge port 16, generally in a direction opposite to the direction F. The direction of flow opposite to the direction F during purging may be referred to as the absorption direction, wherein the air absorbs the fuel vapors trapped in the canister 10. In the absorption direction, the cross-sectional area of the internal volume of the casing 12 may decrease from the vent port 18 to the purge port 16, particularly at the transition zone 24 between the second zone 22 and the first zone 20. The cross-sectional area decreases dramatically from the second zone 22 to the first zone 20.

The transition zone 24 of the internal volume includes an adsorbent bed including a layer of first adsorbent material 26, and the second zone 22 of the internal volume includes an adsorbent bed including a layer of second adsorbent material 28. The layer of first adsorbent material 26 is disposed adjacent to and immediately upstream from the layer of second adsorbent material 28 in the flow direction from the vent port 18 to the purge port 16. The first adsorbent material 26 has a flow restriction (i.e. a property of restricting/inhibiting the flow of fluid) that is lower than the flow restriction of the second adsorbent material 28. Particularly, the first adsorbent material 26 is an adsorbent with a larger mean particle diameter than the second adsorbent material 28. In other words, the first adsorbent material 26 has a larger mean particle diameter relative to the second adsorbent material 28, and the second adsorbent material 28 has a smaller mean particle diameter relative to the first adsorbent material 26. For example, the first adsorbent material 26 having the lower flow restriction property may have a mean particle diameter that is at least 1.2 times larger than the mean particle diameter of the second adsorbent material 28 having the higher flow restriction property. Further, by way of example only, the adsorbent materials 26, 28 may be activated carbons, and the first adsorbent material 26 may be a pellet carbon while the second adsorbent material 28 may be a granular carbon. Alternatively, the first and second adsorbent materials 26, 28 may both be granular carbons, with the granular carbon comprising the first adsorbent material 26 having a larger mean particle diameter than the granular carbon comprising the second adsorbent material 26. Similarly, the first and second adsorbent materials 26, 28 may both be pellet carbons, with the pellet carbon comprising the first adsorbent material 26 having a larger mean particle diameter than the pellet carbon comprising the second adsorbent material 26. However, it should be understood that the adsorbents may be other types or forms of adsorbents such as spherical, honeycomb, cylindrical, structured media of an extruded, wound, folded, pleated, corrugated, bonded, or poured form, sheets, foams, and the like, so long as a low flow restriction adsorbent layer (e.g. an adsorbent having a larger mean particle diameter) immediately precedes a high flow restriction adsorbent layer (e.g., an adsorbent having a smaller mean particle diameter) at or immediately after a transition zone of changing/changed cross-sectional area. The adsorbent bed volume of the layer of second adsorbent material 28 is greater than the adsorbent bed volume of the layer of first adsorbent material 26. For example, the volume of second adsorbent material 28 may be at least three times larger than the volume of the first adsorbent material 26. Also, the height of the layer of first adsorbent material 26 in the flow direction is smaller than the height of the layer of second adsorbent material 28, and the height of the first adsorbent material 26 may be, for example, in the range of 25 to 35 mm, more preferably 27.5 to 32.5 mm, even more preferably 29 to 31 mm, and even more preferably approximately 30 mm.

Optionally, the first zone 20 of the casing 12 may include an adsorbent bed including a layer of third adsorbent material 30, the third adsorbent material 30 having a flow restriction that is higher than the flow restriction of the first adsorbent material 26. Preferably, the third adsorbent material 30 is the same as the second adsorbent material 28, but the third adsorbent material 30 is not limited to such an arrangement. The composition of the third adsorbent material 30 is not particularly limited. Alternatively, the first zone 20 includes a volume of void space, in which case the flow restriction in the first zone 20 is less than the flow restriction of the first adsorbent material 26.

Turning to FIG. 3, in certain embodiments the fuel vapor storage canister 110 includes a casing 112 having a charge port 114, a purge port 116, and a vent port 118, wherein the vent port 118 is alongside and facing the same direction as the charge port 114 and purge port 116, but at an opposite end of the flow path through the internal volume of the canister 110 from the charge port 114 and purge port 116 to the vent port 118. In this arrangement, the first zone 120 is located adjacent the charge port 114 and is separated by a partition 121 from a third zone 123 that is located adjacent the purge port 116. The transition zone 124 is disposed directly adjacent to the first zone 120 (and third zone 123) immediately downstream (in a fluid flow direction F' from the charge port 114 to the vent port 118) from the change in cross-sectional area in the internal volume of the casing 112 caused by the partition 121. The transition zone 124 is also directly adjacent to and upstream from the second zone 122 in the flow direction F'. The transition zone 124 is filled with the first adsorbent material 126, and the second zone 122 is filled with the second adsorbent material 128. The first adsorbent material 126 and the second adsorbent material 128 have the same properties as the first and second adsorbent materials 26, 28, respectively, discussed above. The first zone 120 may be filled with a third adsorbent material 130. The properties of the third adsorbent material 130 are not significant or particularly limited, and the third adsorbent material 130 may be the same as the first adsorbent material 126 or the second adsorbent material 128. In an alternative embodiment not shown, the first zone 120 may not be filled with an adsorbent, thereby being an empty void space. In yet another alternative, a flow tube or other conduit may extend from the charge port 114 to the first adsorbent material 126 in the transition zone 124 such that the change in cross-sectional area along the fluid flow path between the charge port 114 and the internal volume of the casing 112 is from the terminal end of the flow tube to the transition zone 124. Similarly, the third zone 123 adjacent the purge port 116 may be filled with a fourth adsorbent material 132. The properties of the fourth adsorbent material 132 are also not significant or particularly limited, and the fourth adsorbent material 132 may be the same as the first adsorbent material 126, the second adsorbent material 128, or the third adsorbent material. Alternatively, the fourth adsorbent material 132 may be different than first adsorbent material 126, the second adsorbent material 128, and the third adsorbent material. In an alternative embodiment not shown, the third zone 123 may not be filled with an adsorbent, thereby being an empty void space. In yet another alternative, a flow tube or other conduit may extend from the purge port 116 to the first adsorbent material 126 in the transition zone 124. A fourth zone 134 is located adjacent the vent port 118. The fourth zone 134 is filled with a fifth adsorbent material 136. The properties of the fifth adsorbent material 136 are not significant or particularly limited, and may or may not be the same as the third adsorbent material 130 or any of the other adsorbent materials 126, 128, 132. An empty void space 138 in the internal volume of the canister 112 extends between the second zone 122 and the fourth zone 134 along the fluid flow path through the internal volume of the canister 112.

With reference again to FIG. 1, during periods of non-operation of the internal combustion engine, fuel vapors generated from the liquid fuel stored in the fuel tank enter the fuel vapor storage canister 10 through the charge port 14. As the fuel vapors pass into the adsorbent zones 20, 22, 24 within the casing 12, the fuel vapors are adsorbed by the layers of adsorbent materials 26, 28, and 30 (if present). Essentially only clean air exits the canister 10 through the vent port 18 while the fuel vapors remain trapped within the canister 10. When the internal combustion engine is started and operational, external air is drawn into the canister 10 through the vent port 18. As the air passes through the adsorbent zones 20, 22, 24 the fuel vapors are desorbed into the air and carried away from the adsorbent materials 26, 28, and 30 (if present) and into the flow of air. The flow of charge air is thus generally in the direction F from the charge port 14 to the vent port 18, with the charge port 14 being on an upstream side and the vent port 18 being on a downstream side. Significantly, the layers of adsorbent materials 26, 28, and 30 (if present) provide for homogeneous flow through the zones 20, 22, 24 within the casing 12. Particularly, as the air flow passes through the transition zone 24, the layer of more flow-restrictive adsorbent material 28 in the downstream second zone 22 forces a component of the flow of air in the less flow-restrictive transition zone 24 to go sideways (generally or nearly perpendicular to the direction from the vent port 18 to the purge port 16) as shown schematically in FIG. 2. Stated differently, the layer of first adsorbent material 26 having a lower flow restriction than the downstream layer of second adsorbent material 28, spreads the flow of fluid along the fluid flow path into the layer of second adsorbent material 28. This sideways component of flow allows the charge air to reach the edge of the transition zone 24, thereby improving flow distribution in the transition zone 24, eliminating any "dead zones" in the corner of or along the edge of the transition zone 24, and assuring that fuel vapors are adsorbed by the entire layer/bed of adsorbent material 26 in the transition zone 24. Hence, during charging that is accomplished during non-operation of the vehicle engine, the adsorbent materials 26, 28, and 30 (if present) in the canister 10 are more completely charged with fuel vapors for later purging into the intake air of the engine when the engine is next turned on. A similar but not as significant flow distribution effect may be observed when the flow of air is reversed during operation of the vehicle (purging), and the air absorbs/resorbs the fuel vapors trapped in the adsorbent materials 26, 28, 30. In this case, the flow of air is from the second zone 22 through the transition zone 24 and into the first zone 20.

Due to the improved flow distribution and elimination of dead zones provided by the layer of less flow-restrictive adsorbent material 26 present in a transition zone 24 of changing cross-sectional area that is directly upstream from the layer of higher flow-restrictive adsorbent material 28 in a purge-flow direction, the resulting increase in performance and efficiency of the canister 10 allows for a reduction in total adsorbent material volume in the canister 10 to achieve the same working capacity. The reduction in required adsorbent material volume in turn provides a cost benefit by reducing the material cost of the canister 10, and also reduces the total weight of the canister 10. Furthermore, the use of less expensive, more flow-restrictive granular carbon as the adsorbent material 28 in the higher cross-sectional area(s) of the second zone 22 reduces the component cost of the canister 10.

Turning again to FIG. 3, during periods of non-operation of the internal combustion engine, fuel vapors generated from the liquid fuel stored in the fuel tank enter the fuel vapor storage canister 110 through the charge port 114. As the fuel vapors pass from the charge port 114 and the first zone 120 into the first adsorbent material 126 in the transition zone 124, the layer of first adsorbent material 126 having a larger particle size and lower flow restriction, provides for the sideways, homogeneous spread of fluid flow across the first zone 120 and into the second adsorbent material 128 in the second zone 122. The flow of fuel vapors and air is thus generally in the direction F from the charge port 114 to the vent port 118, with the charge port 114 being on an upstream side and the vent port 118 being on a downstream side. The layer of first adsorbent material 126 having a lower flow restriction than the downstream layer of second adsorbent material 128, spreads the flow of fluid along the fluid flow path into the layer of second adsorbent material 128, thereby allowing the fuel vapors to be more evenly spread throughout the second zone 122 so that the second adsorbent material 128 may be more completely charged with fuel vapors.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. An evaporative emissions canister comprising:
 a casing defining an internal volume therein;
 the casing including an inlet and an outlet in fluid communication with the internal volume;
 the internal volume including a layer of first adsorbent material and a layer of second adsorbent material, the first adsorbent material having a flow restriction that is lower than the flow restriction of the second adsorbent material;
 a fluid flow path defined from the inlet through the internal volume of the casing to the outlet;
 the fluid flow path having a cross-sectional area that varies in a direction from the inlet to the outlet, the fluid flow path including a transition zone of changing cross-sectional area in the direction from the inlet to the outlet;
 wherein the layer of first adsorbent material is disposed at or directly adjacent to the transition zone, the layer of first adsorbent material is disposed adjacent to and immediately upstream from the layer of second adsorbent material in said direction, and wherein the layer of first adsorbent material spreads a flow of fluid along the fluid flow path into the layer of second adsorbent material.

2. The evaporative emissions canister of claim 1, wherein the first adsorbent material has a mean particle diameter that is at least 1.2 times larger than the mean particle diameter of the second adsorbent material.

3. The evaporative emissions canister of claim 2, wherein the first adsorbent material is a pellet carbon, and the second adsorbent material is a granular carbon.

4. The evaporative emissions canister of claim 1, wherein the internal volume includes the transition zone of changing cross-sectional area.

5. The evaporative emissions canister of claim 4, wherein the internal volume includes a first zone having a first cross-sectional area, the first zone being at the inlet end of the casing; the internal volume further including a second zone having a second cross-sectional area, the second zone being at the outlet end of the casing, and the second cross-sectional area being larger than the first cross-sectional area; and
 wherein the transition zone of changing cross-sectional area is disposed between the first and second zones; the transition zone including the layer of first adsorbent material, and the second zone including the layer of second adsorbent material.

6. The evaporative emissions canister of claim 5, wherein the first zone includes a layer of third adsorbent material, the third adsorbent material having a flow restriction that is higher than the flow restriction of the first adsorbent material.

7. The evaporative emissions canister of claim 6, wherein the third adsorbent material is the same as the second adsorbent material.

8. The evaporative emissions canister of claim 5, wherein the first zone includes a volume of void space.

9. The evaporative emissions canister of claim 1, wherein a height of the layer of first adsorbent material in the direction from the inlet to the outlet is smaller than a height of the layer of second adsorbent material in said direction.

10. The evaporative emissions canister of claim 1, wherein the change in cross-sectional area in the transition zone is stepped in the direction from the inlet to the outlet.

11. A fuel vapor storage canister for adsorbing fuel evaporated in a fuel tank of an automotive vehicle, the fuel vapor storage canister comprising:
 a casing forming a main body defining at least one chamber therein;
 a vent port in the main body, the vent port being open to atmosphere;
 a purge port in the main body, the purge port being on an opposite end of the main body than the vent port, and the purge port being in fluid communication with an air intake system of the vehicle;
 the at least one chamber having a cross-sectional area that varies in a direction from the vent port to the purge port; and
 the at least one chamber including a bed of first adsorbent material and a bed of second adsorbent material, the first adsorbent material having a flow restriction that is lower than the flow restriction of the second adsorbent material;
 wherein the bed of first adsorbent material is disposed at or directly adjacent to a transition zone of changing cross-sectional area of the at least one chamber in the direction from the vent port to the purge port, and the bed of first adsorbent material is disposed adjacent to and immediately upstream from the bed of second adsorbent material in said direction.

12. The fuel vapor storage canister of claim 11, wherein the first adsorbent material has a mean particle diameter that is at least 1.2 times larger than the mean particle diameter of the second adsorbent material.

13. The fuel vapor storage canister of claim 12, wherein the first adsorbent material is a pellet carbon, and the second adsorbent material is a granular carbon.

14. The fuel vapor storage canister of claim 11, wherein the change in cross-sectional area in the transition zone is stepped in the direction from the vent port to the purge port.

15. A method of making an evaporative emissions canister, the method comprising the steps of:
 providing a casing having an internal volume, an inlet and an outlet in fluid communication with the internal volume, and a fluid flow path defined from the inlet through the internal volume of the casing to the outlet, the fluid flow path having a cross-sectional area that varies in a direction from the inlet to the outlet, the fluid flow path including a transition zone of changing cross-sectional area in the direction from the inlet to the outlet;

disposing a layer of first adsorbent material at or directly adjacent to the transition zone;

disposing a layer of second adsorbent material adjacent to and immediately downstream from the layer of first adsorbent material in said direction;

wherein the first adsorbent material has a flow restriction that is lower than the flow restriction of the second adsorbent material, and the layer of first adsorbent material spreads a flow of fluid along the fluid flow path into the layer of second adsorbent material.

16. The method of claim 15, wherein the first adsorbent material has a mean particle diameter that is at least 1.2 times larger than the mean particle diameter of the second adsorbent material.

17. The method of claim 16, wherein the first adsorbent material is a pellet carbon, and the second adsorbent material is a granular carbon.

18. The method of claim 15, wherein the change in cross-sectional area in the transition zone is stepped in the direction from the inlet to the outlet.

* * * * *